United States Patent
Breen et al.

(10) Patent No.: US 10,954,984 B2
(45) Date of Patent: Mar. 23, 2021

(54) COLLAR AND SHAFT ASSEMBLY

(71) Applicant: STANDARD LIFTERS, INC., Grand Rapids, MI (US)

(72) Inventors: Scott M. Breen, Marne, MI (US); Joel T. Pyper, Grand Rapids, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 573 days.

(21) Appl. No.: 15/801,659

(22) Filed: Nov. 2, 2017

(65) Prior Publication Data

US 2018/0149184 A1    May 31, 2018

Related U.S. Application Data

(60) Provisional application No. 62/428,008, filed on Nov. 30, 2016.

(51) Int. Cl.
*F16B 21/18* (2006.01)
*B21D 22/00* (2006.01)
*B21D 39/06* (2006.01)

(52) U.S. Cl.
CPC .............. *F16B 21/18* (2013.01); *B21D 22/00* (2013.01); *B21D 39/06* (2013.01)

(58) Field of Classification Search
CPC ......... B21D 22/00; B21D 39/06; F16B 21/18; F16B 21/183; F16B 21/186; F16D 1/0829; F16D 1/116; Y10T 403/58; Y10T 403/581; Y10T 403/7075
USPC ........................... 403/315, 316, 376; 464/182
See application file for complete search history.

(56) References Cited

U.S. PATENT DOCUMENTS

| | | | |
|---|---|---|---|
| 2,487,233 A | 11/1949 | Gerke | |
| 2,663,180 A | 12/1953 | Benedict | |
| 3,126,922 A | 3/1964 | Randlett et al. | |
| 3,190,703 A | 6/1965 | Thomson et al. | |
| 3,474,656 A | 10/1969 | Kraft | |
| 3,514,166 A | 5/1970 | Coley | |
| 3,812,756 A * | 5/1974 | Wenger | F16B 21/18 411/353 |
| 4,036,056 A | 7/1977 | Saunders | |
| 4,077,232 A * | 3/1978 | Grosseau | F16B 21/183 403/326 |
| 4,135,770 A | 1/1979 | Doherty et al. | |
| 4,199,313 A | 4/1980 | Bohnenberger | |
| 4,483,173 A | 11/1984 | Duhamel | |
| 4,696,180 A | 9/1987 | Zandel | |
| 4,732,033 A | 3/1988 | Smedberg et al. | |
| 4,742,746 A | 5/1988 | Olsson | |
| 4,796,460 A | 1/1989 | Smedberg et al. | |
| 4,900,017 A | 2/1990 | Bold, Jr. | |
| 4,926,563 A | 5/1990 | Smith | |
| RE33,940 E | 5/1992 | Matsuo | |
| 5,113,736 A | 5/1992 | Meyerle | |
| 5,245,904 A | 9/1993 | Meyerle | |

(Continued)

FOREIGN PATENT DOCUMENTS

DE    3227431 A1 *  8/1983 .............. F16B 21/18

*Primary Examiner* — Josh Skroupa
(74) *Attorney, Agent, or Firm* — Price Heneveld LLP (57) ABSTRACT

A collar and shaft assembly utilizing a ring and a multi-stepped groove. The multi-stepped groove permits the ring to be compressed into one groove while the collar is being assembled and then to expand into a different groove that permits the ring to contact surfaces on both the collar and the shaft.

7 Claims, 14 Drawing Sheets

(56) References Cited

U.S. PATENT DOCUMENTS

| | | |
|---|---|---|
| 5,328,276 A | 7/1994 | Linteau |
| 5,397,135 A | 3/1995 | Smith |
| 5,667,332 A * | 9/1997 | Lindholm ............... F16B 21/18 |
| | | 403/326 |
| 5,722,280 A | 3/1998 | Bodnar |
| 5,758,374 A | 6/1998 | Ronci |
| 5,788,903 A | 8/1998 | Allgaier |
| 6,220,946 B1 | 4/2001 | Arnold |
| 6,408,728 B1 | 6/2002 | Tsuji et al. |
| 6,755,104 B2 | 6/2004 | Grant |
| 6,848,290 B2 | 2/2005 | Pyper et al. |
| 6,925,922 B2 | 8/2005 | Manabe et al. |
| 6,986,273 B2 | 1/2006 | Rager |
| 7,000,446 B2 | 2/2006 | Nieschulz et al. |
| 7,004,007 B2 | 2/2006 | Kruger et al. |
| 7,114,365 B2 | 10/2006 | Rooney, Jr. et al. |
| 7,152,451 B1 | 12/2006 | Cotter |
| 7,326,092 B2 | 2/2008 | Fedder et al. |
| 7,481,711 B2 * | 1/2009 | Fukumura ............... F16D 3/223 |
| | | 403/359.5 |
| 7,730,757 B2 | 6/2010 | Pyper et al. |
| 7,950,262 B2 | 5/2011 | Pyper et al. |
| 8,074,486 B1 | 12/2011 | Pyper et al. |
| 8,074,515 B2 | 12/2011 | Van Kann et al. |
| 8,151,619 B2 | 4/2012 | Pyper et al. |
| 8,186,924 B1 * | 5/2012 | Espinosa ............... F16B 21/186 |
| | | 411/353 |
| 8,291,603 B2 | 10/2012 | Saegesser et al. |
| 8,567,227 B2 * | 10/2013 | Cotter ................... B21D 37/12 |
| | | 72/455 |
| 8,616,038 B2 | 12/2013 | Breen et al. |
| 8,910,502 B2 | 12/2014 | Breen et al. |
| 8,919,178 B2 | 12/2014 | Breen et al. |
| 8,939,005 B2 | 1/2015 | Breen |
| 9,272,321 B2 | 3/2016 | Breen et al. |
| 9,302,311 B2 | 4/2016 | Pyper et al. |
| 9,810,322 B2 * | 11/2017 | Bueter ..................... F16J 1/12 |
| 9,958,069 B2 * | 5/2018 | Bueter ..................... F16J 15/00 |
| 10,253,819 B2 * | 4/2019 | Sherlock ............... F16B 21/18 |
| 2009/0193865 A1 | 8/2009 | Pyper et al. |
| 2011/0192206 A1 | 8/2011 | Cotter |
| 2011/0296893 A1 | 12/2011 | Breen et al. |
| 2011/0302988 A1 | 12/2011 | Breen et al. |
| 2012/0055224 A1 | 3/2012 | Breen et al. |
| 2012/0055226 A1 | 3/2012 | Breen et al. |
| 2018/0080490 A1 * | 3/2018 | Bredbeck ............... F16B 21/18 |

* cited by examiner

COLLAR AND SHAFT ASSEMBLY

CROSS REFERENCE TO RELATED APPLICATION

Applicant hereby claims the priority benefits under the provisions of 35 U.S.C. § 119, basing said claim of priority on related U.S. Provisional Application No. 62/428,008 filed Nov. 30, 2016, which is incorporated in its entirety herein by reference.

BACKGROUND OF THE INVENTION

The present invention relates to a collar and shaft assembly and the like, and in particular to a shaft with a snap on collar. This collar and shaft assembly can be used for a variety of purposes, including in metal forming dies.

Shafts with collars can be used for a variety of purposes. For example, they can be used to provide a positive stop between components with the collar acting as a shoulder to abut the surface of another component. One example of this is in metal forming dies. Metal forming dies, such as stamping dies and the like, are well-known in the art. Progressive metal forming dies are unique, very sophisticated mechanisms which have multiple stations or progressions that are aligned longitudinally and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one-of-a-kind assemblies for a particular part, with each of the various components being handcrafted and custom-mounted or fitted in an associated die set, which is in turn positioned in a stamping press. Not only are the punches and the other forming tools in the die set individually designed and constructed, but the other parts of the die set, such as stock lifters, guides, end caps and keepers, cam returns, etc., are also custom designed, and installed in the die set. Current die making processes require carefully machined, precision holes and recesses in the die set for mounting the individual components, such that the same are quite labor intensive and require substantial lead time to make, test, and set up in a stamping press. Consequently, such metal forming dies are very expensive to design, manufacture, and repair or modify.

It would be further advantageous to have a collar and shaft assembly that can be used in a die or other situation that requires a collar with a shoulder that can receive a large force without breaking or shearing the assembly. It would be also advantageous to have a collar and shoulder assembly that is easy to assemble but stays connected to the shaft over time.

SUMMARY OF THE INVENTION

One aspect of the present invention is a collar and shaft assembly. The collar and shaft assembly includes a shaft having a generally cylindrical shape with a first end portion, a second end portion, and a stepped groove. The collar and shaft assembly includes a collar having a generally cylindrical shape with a first end portion, a second end portion, and an aperture that extends through the collar with a first generally cylindrical inner sidewall, and a second generally tapered inner sidewall. A groove extends about the interior surface of the first generally cylindrical inner sidewall. The collar and shaft assembly also includes a retainer ring that is closely received and retained in the stepped groove in the shaft and the groove on the collar.

Yet another aspect of the present invention is a collar and shaft assembly that includes a shaft having a generally cylindrical shape, a first end portion, a second end portion, and a retainer ring groove on the exterior surface of the shaft. The collar and shaft assembly includes a collar having generally cylindrical shape with a first end portion, a second end portion, an aperture that extends through the collar, and a stepped groove extending circumferentially above the interior surface of the aperture in the collar. The collar and shaft assembly also includes a retainer ring closely received and retained in the stepped groove in the collar and in the retainer ring groove on the shaft.

Yet another aspect of the present invention is a method for making a collar and shaft assembly. The method includes forming a shaft with a first end portion, a second end portion, and a stepped groove extending circumferentially about an exterior surface of the shaft. The stepped groove includes a first portion with a first groove depth and a second portion with a second groove depth that is less than the first groove depth. The method includes forming a collar with a first end portion, a second end portion, and an aperture that extends through the collar having a first generally cylindrical inner sidewall, and a second generally tapered inner sidewall. The method includes providing a retainer ring to be closely received in the stepped groove. The method further includes advancing the collar over the shaft until the generally tapered portion of the collar engages and compresses the retainer ring into the first portion of the stepped groove and then further advancing the collar over the shaft until the retainer ring expands and is seated in between the second portion of the stepped groove on the shaft and the groove on the collar.

These and other advantages of the invention will be further understood and appreciated by those skilled in the art by reference to the following written description, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIGS. 1-28. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 2 (FIGS. 1, 2) generally designates a collar and shaft assembly embodying the present invention. The collar and shaft assembly 2 includes a collar 4 with an aperture 6. Aperture 6 can be a generally cylindrical through-hole, as illustrated in FIG. 2. The collar 4 has a first end 16 and a second end 18 with the generally cylindrical aperture 6 extending between the first end 16 and the second end 18. The collar 4 also has a tapered portion 12 located at the second end 18 of the collar 4. A groove 14 is located in the interior of the aperture 6, as illustrated in FIG. 2.

Figure 3:
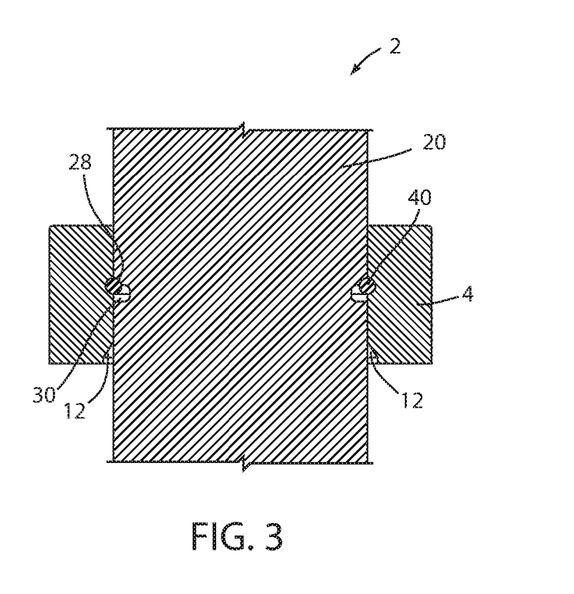
FIG. 3 is a fragmentary, cross-sectional view of the collar and shaft assembly with the collar assembled on the shaft.
Figure 13:
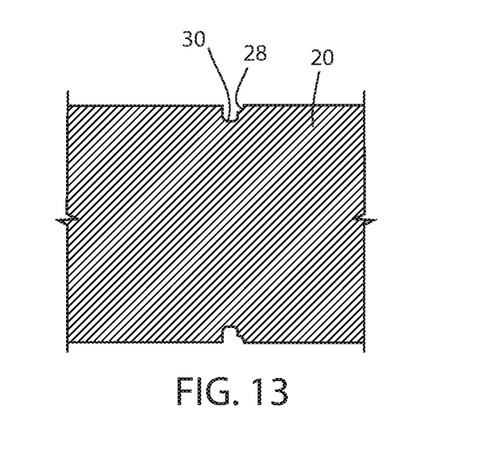
FIG. 13 is a partial cross-sectional view of the shaft.

The collar and shaft assembly 2 also has a shaft 20 with a first end 22 and a second end 24. The shaft has a stepped groove 26 with a first portion 28 and a second portion 30, as illustrated in FIG. 13. The second portion 30 has a depth that is greater than the depth of the first portion 28, as illustrated in FIGS. 3 and 13.

Figure 1:
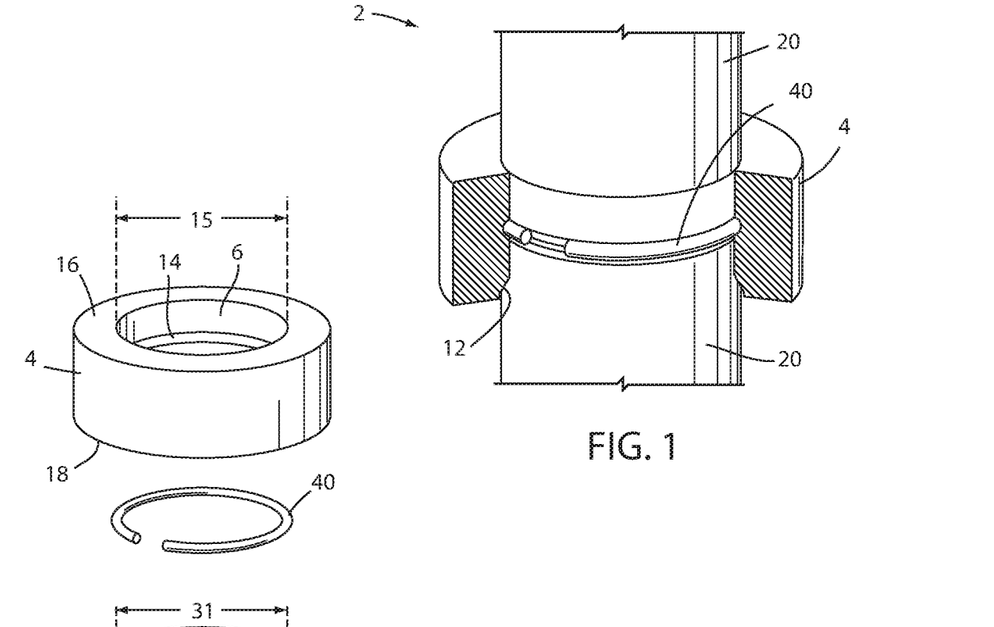
FIG. 1 is a fragmentary view of a collar and shaft assembly embodying the present invention.
Figure 2:
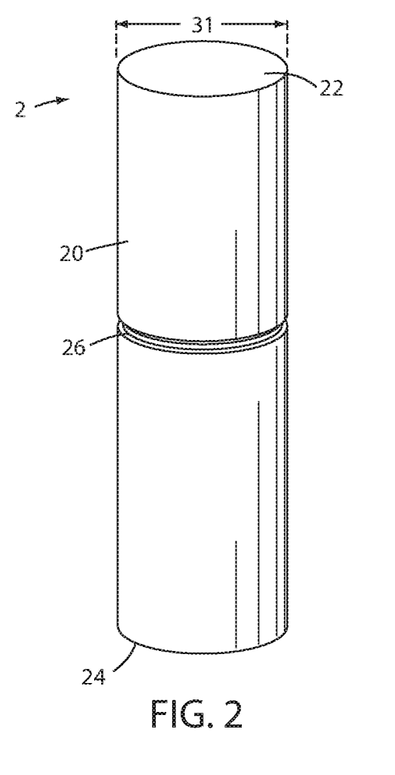
FIG. 2 is an exploded perspective view of the collar and shaft assembly shown in FIG. 1.

A retainer 40 is used to connect the collar 4 and the shaft 20, as illustrated in FIG. 1. The retainer 40 in the illustrated embodiment is a metal C-ring. However, any type of retainer can be used to fix the location of the collar 4 on the shaft 20 provided the retainer can expand and contract and ultimately be retained in between the first portion 28 of the stepped groove 26 and the groove 14 of the collar 4.

Figure 4:
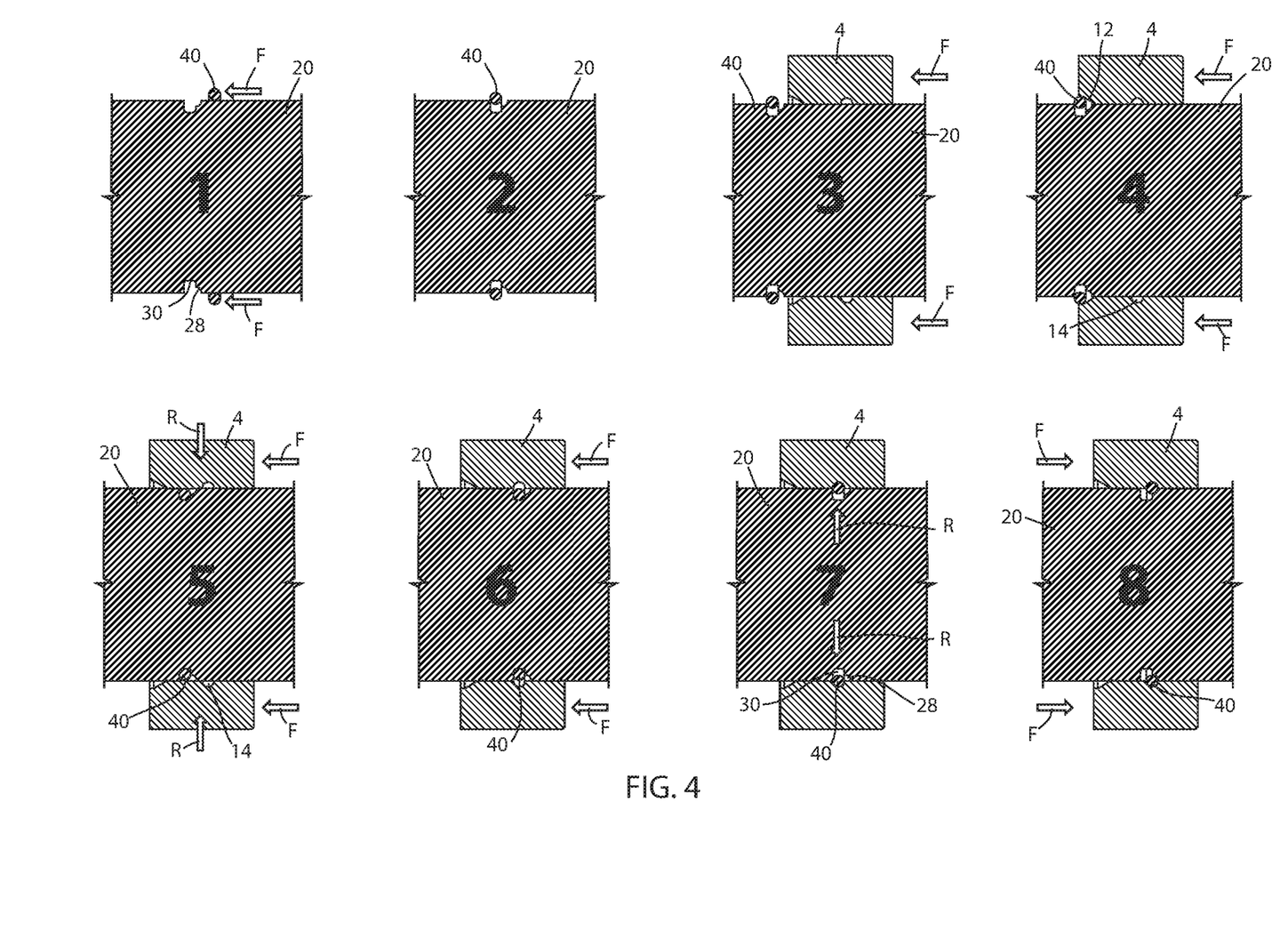
FIG. 4. is a partial cross-sectional view of one preferred sequence for assembling the collar and shaft assembly shown in FIGS. 1-3.

The steps for creating the assembly 2 are shown in FIG. 4. The first step involves loading the retainer 40 over the shaft 20. In the second step, the retainer 40 is snapped into the stepped groove 26. The third step involves loading the collar 4 over the shaft 20 by applying force in the direction shown by the arrows in FIG. 4. The fourth step involves the tapered portion 12 of the collar 4 capturing and centering the retainer 40. The fifth step involves the tapered portion 12 of the collar 4 compressing the retainer 40 into the second portion 30 of the stepped groove 26 shown by the arrows R, while the collar is moved in the direction shown by the arrows F. The sixth step involves sliding the collar 4 over the shaft 20 until the stepped groove 26 of the shaft 20 and the groove 14 of the collar 4 are aligned. As illustrated in the seventh step, when the grooves 26, 14 are aligned, the retainer 40 expands into the groove 14 on the collar 4, as shown by the arrows R. In the eighth step, the collar 4 is then shifted backwards in direction, as shown by arrows F, until the collar 4 stops with the retainer 40 in the first portion 28 of the stepped groove 26 of shaft 20 and the groove 14 of collar 4.

Figure 5:
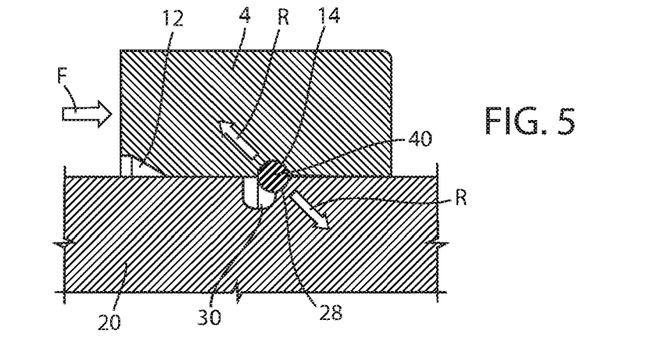
FIG. 5 is a fragmentary, cross-sectional view of the collar and shaft assembly of FIG. 1 showing a directional force on the collar and shaft assembly.

As illustrated in FIG. 5, when force F is applied, the resultant forces are transferred through the retainer 40 into the shaft 20. In this arrangement, the retainer 40 is seated into the groove 14 in the collar 4 and into the first portion 28 of the stepped groove 26 of the shaft 20 with no voids.

Figure 6:
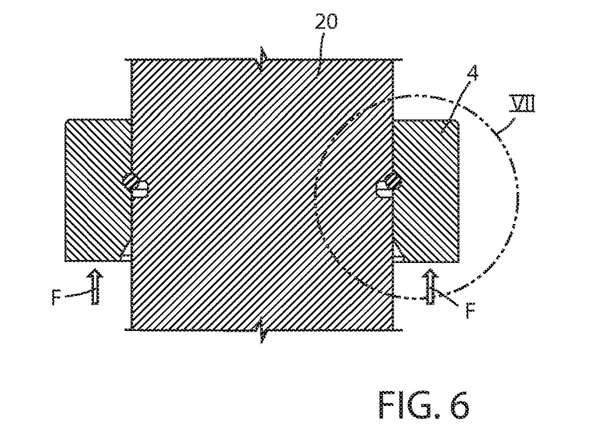
FIG. 6 is a fragmentary, cross-sectional view of the collar and shaft assembly showing a directional force on the collar and shaft assembly.
Figure 7:
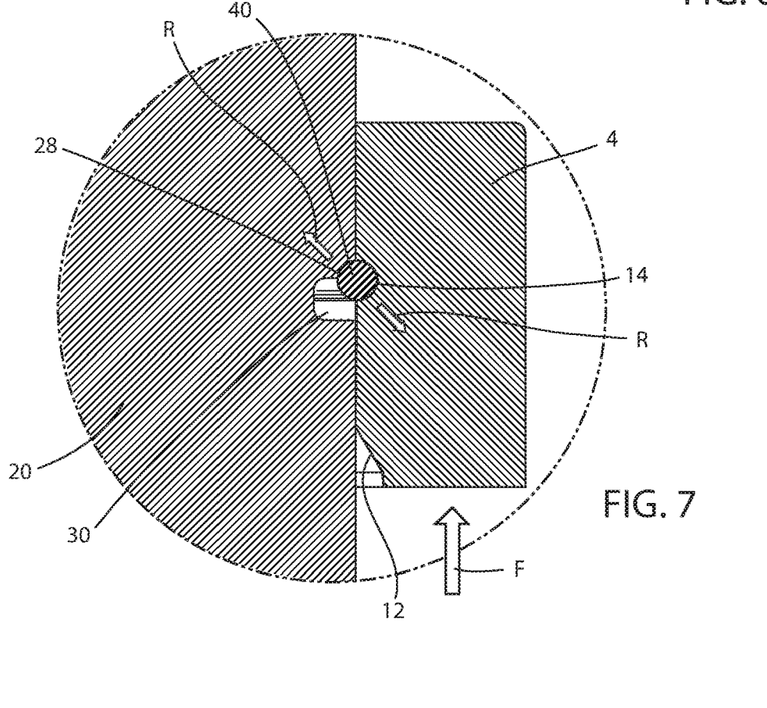
FIG. 7 is a fragmentary, cross-sectional view, taken along line VII of FIG. 6, showing a directional force on the collar and shaft assembly.
Figure 8:
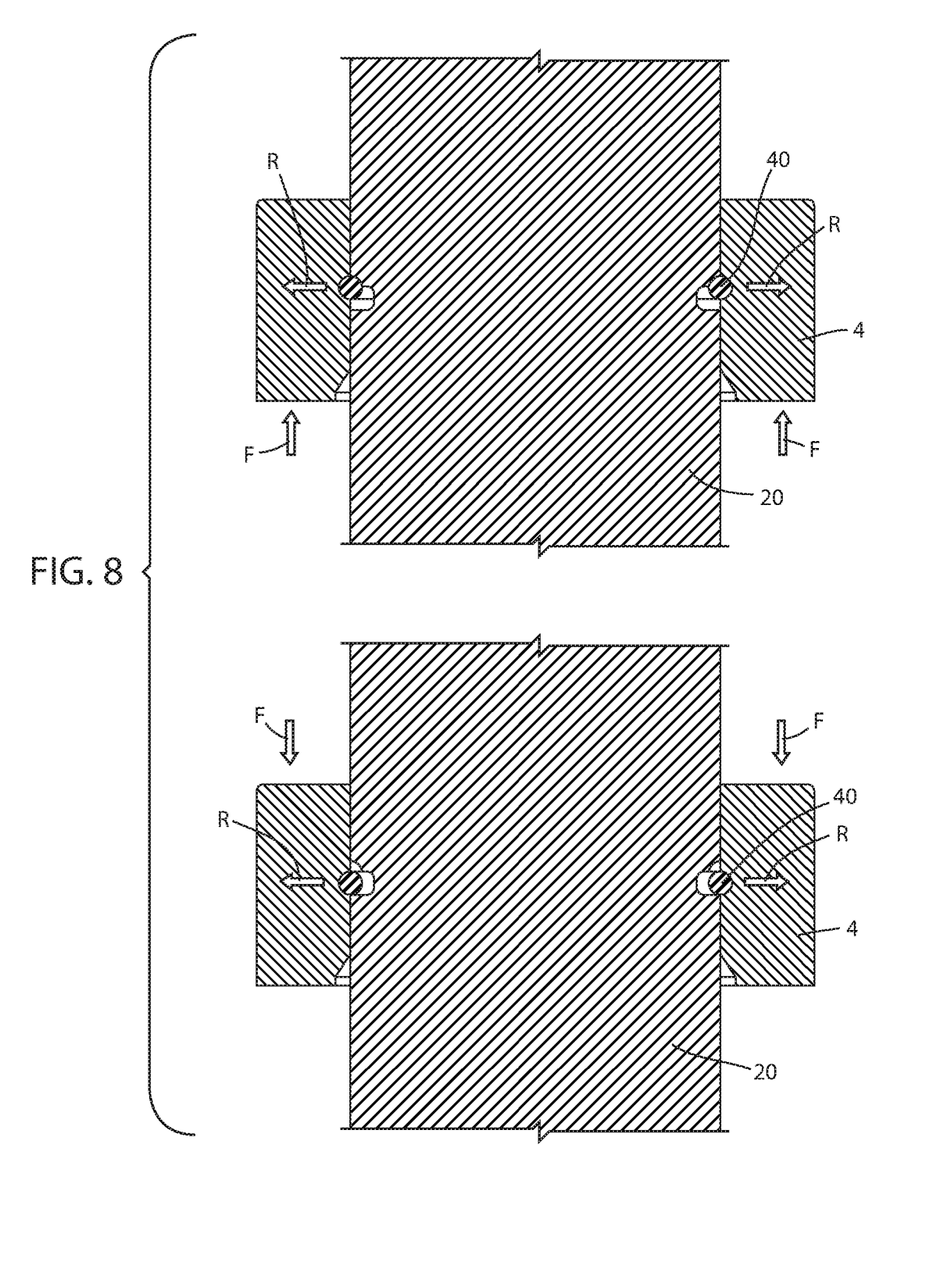
FIG. 8 is a pair of cross-sectional views of the collar and shaft assembly showing the resulting forces on the lower and upper sides of the collar and shaft assembly.

As illustrated in FIGS. 6 and 7, the working forces F against the second end 18 of collar 4 are transferred through the retainer 40 to the shaft 20 and collar 4. The retainer 40 has a high sheer strength and provides a strong transfer of forces from the collar 4 to the shaft 20. This is particularly true where the retainer 40 is a steel C-ring. As illustrated in FIG. 8, the collar and shaft assembly 2 is a permanent and potentially tamper-proof assembly. The retainer 40 is under compression and is always trying to expand into the groove 14 of the collar 4. The illustrated design prevents the compression of the retainer 40 back into second portion 30 of the stepped groove 26 in the shaft 20 thereby preventing removal of the collar 4. No matter which direction the collar 4 is forced, as illustrated by arrows F, the retainer 40 cannot be compressed in a manner to permit the removal of the collar 4 from the shaft 20.

Figure 9:
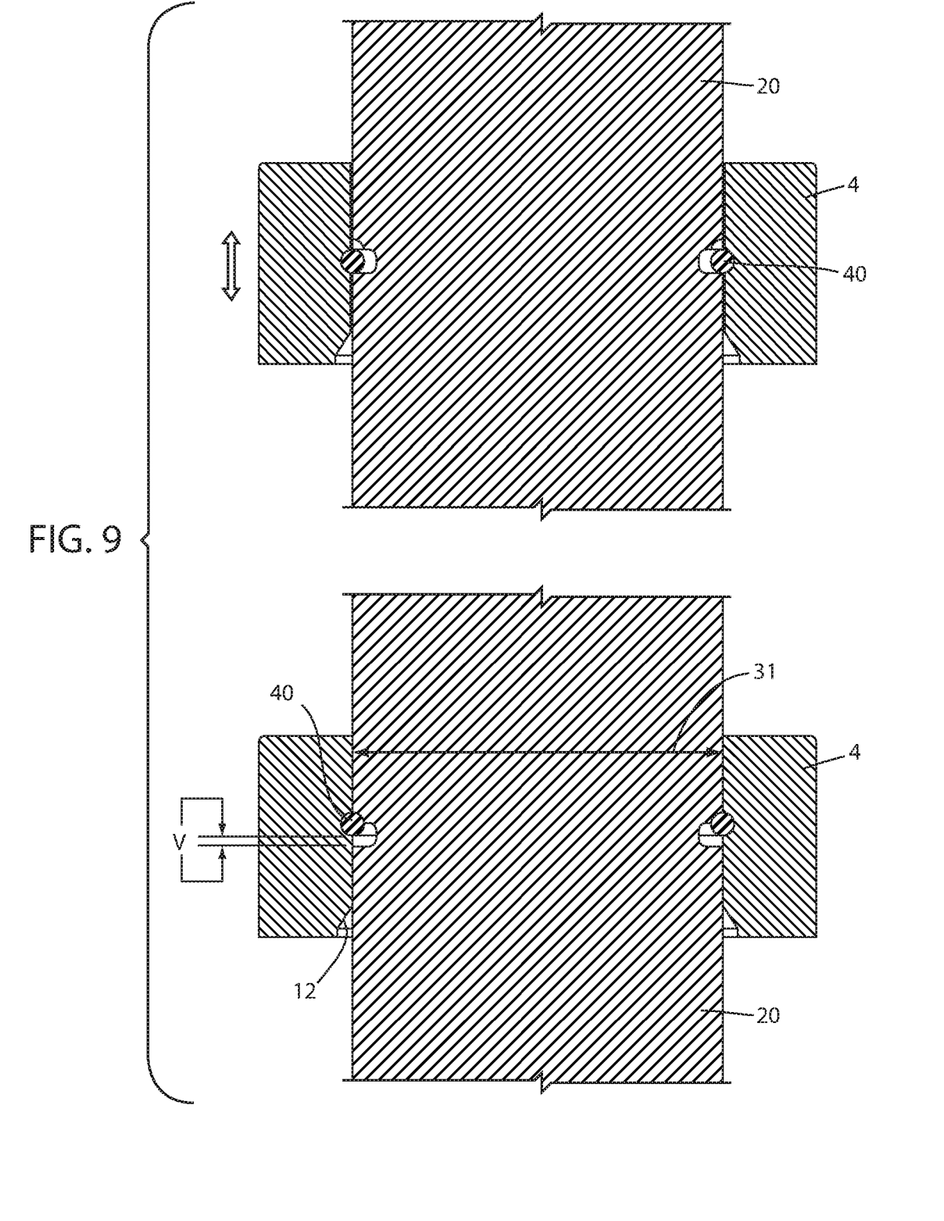
FIG. 9 is a pair of fragmentary, cross-sectional views of the collar and shaft assembly illustrating the sliding of the collar on the shaft when the collar is not press fit on the shaft, as illustrated in the upper figure.

As illustrated in FIG. 9, due to the small void v created by the first and second portions 28, 30 of stepped groove 26, the collar 4 can move along the shaft 20 creating a nonstationary position of the collar 4. To prevent the collar 4 from moving along the shaft 20, the fit between the outside diameter 31 of the shaft 20, as illustrated in FIG. 2, and the inside diameter 15 of the collar 4 can be substantially the same such that there is a press-fit interference between the collar 4 and the shaft 20. Such a press-fit will minimize the ability of the collar 4 to move on the shaft 20 if needed or desired.

Figure 10:
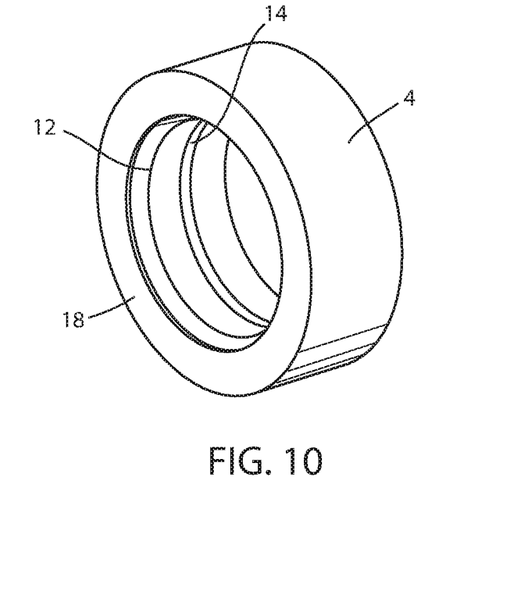
FIG. 10 is a top perspective view of the collar shown in FIG. 1.
Figure 11:
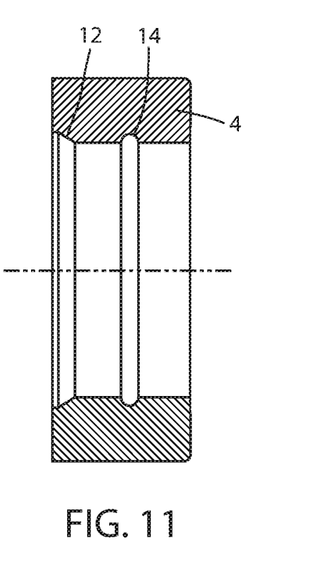
FIG. 11 is a cross-sectional view of the collar.
Figure 12:
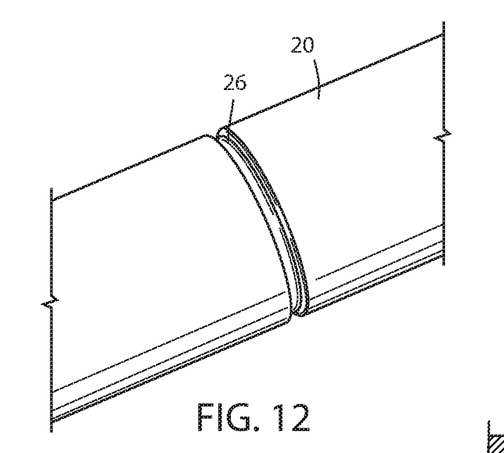
FIG. 12 is a partial side perspective view of the shaft shown in FIG. 1.

As illustrated in FIG. 10, the collar 4 can have a tapered portion 12 near the second end 18. The collar 4 can be formed by a simple turning on a lathe. Similarly, the shaft 20 can be formed by a simple turning on a lathe in order to create the first and second portions 28, 30 of the stepped groove 26.

Figure 14:
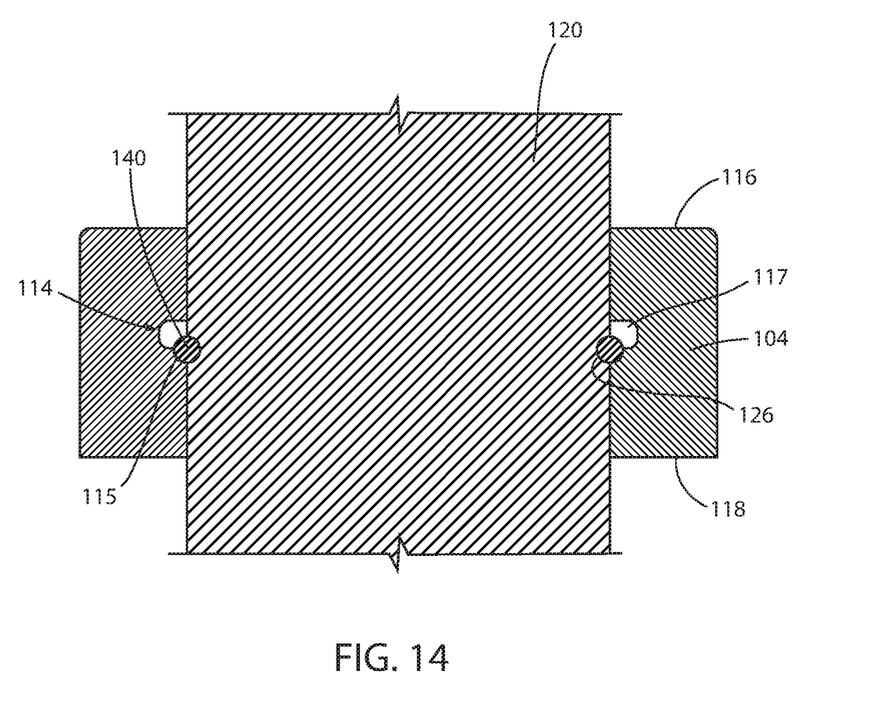
FIG. 14 illustrates another embodiment of the collar and shaft assembly wherein the stepped groove is located on the collar.

Another embodiment is illustrated in FIG. 14 with the single groove 126 on shaft 120 and the stepped groove 114 on the collar 104. The stepped groove 114 on the collar 104 has a first portion 117 and a second portion 115, with a smaller groove depth. The stepped groove 114 is located generally between the first end 116 and the second end 118 of the collar 104.

Figure 15:
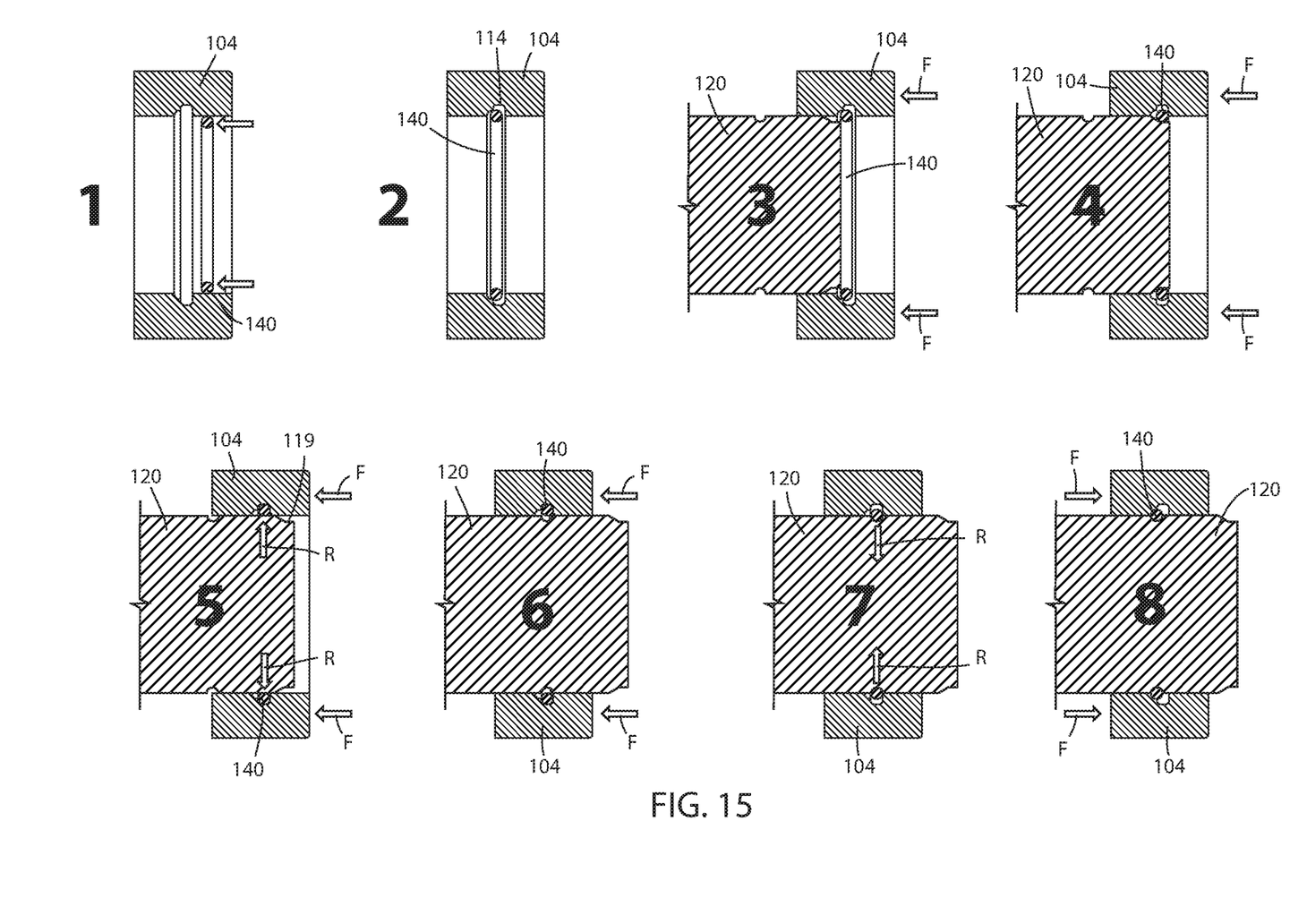
FIG. 15 is a partial cross-sectional view of one preferred sequence for assembling the collar and shaft assembly shown in FIG. 14.

As illustrated in FIG. 15, the first assembly step is the loading of the retainer 140 onto collar 104. Next, the retainer 140 expands into the stepped groove 114. The third step involves loading the collar 104 over the shaft 120 by applying force, as shown in arrows F. Next the shaft 120 captures the retainer 140. This can be accomplished by having a taper 119 formed on the shaft 120, as illustrated in step 5. The taper 119 expands the retainer 140 into the stepped groove 114 on collar 104. The sixth step involves sliding the collar 104 until the grooves 114 and 126 generally align. The seventh step illustrates that when the grooves 114, 126 align, the retainer 140 collapses into the groove 126 in shaft 120. The last step involves shifting the collar 104 back as illustrated by arrows F until the collar 104 stops with the retainer 140 closely received in the second portion 115 of the stepped groove 114 in the collar 104 and the groove 126 in shaft 120.

Figure 16:
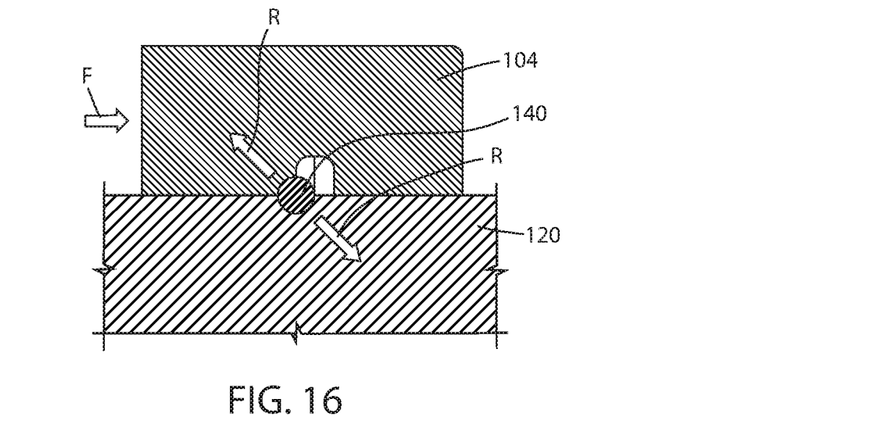
FIG. 16 is a partial cross-sectional view of the collar and shaft assembly shown in FIG. 14 showing a directional force applied to the collar.

As illustrated in FIG. 16, when force F is applied, the retainer 140 remains seated in the groove 114 on the collar 104. The forces are transferred through the retainer 140 into the shaft 120 and collar 104.

Figure 17:
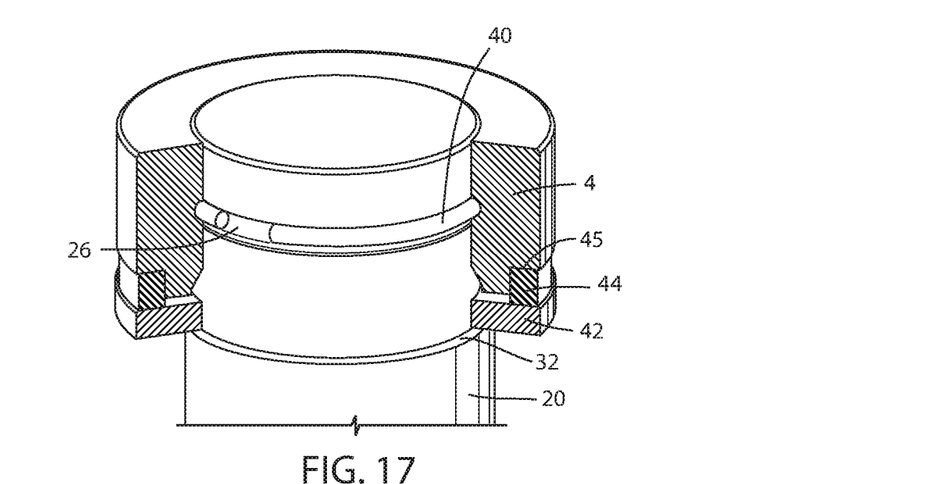
FIG. 17 is another embodiment of the collar and shaft assembly utilizing a dampening member.
Figure 18:
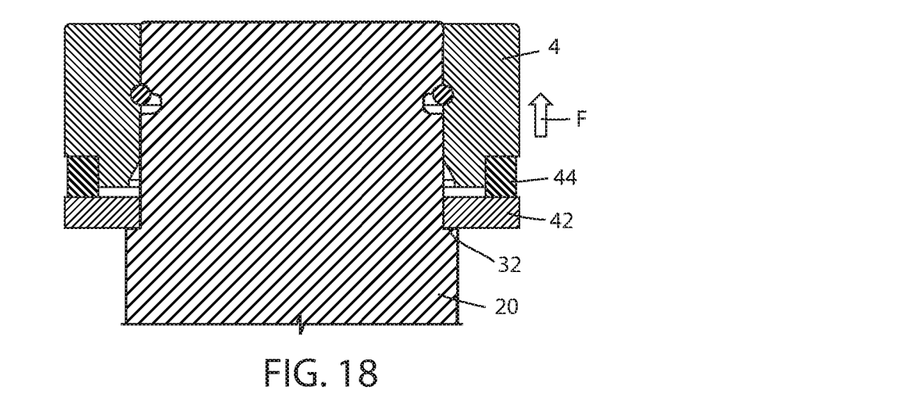
FIG. 18 is a partial cross-sectional view of the collar and shaft assembly shown in FIG. 17.

A dampening device can be added to the collar and shaft assembly 2, as illustrated in FIGS. 17 and 18. A stop disk 42 can be added to prevent the collar 4 from directly contacting the shaft 20, as illustrated in FIG. 17. The stop disk 42 contacts a shoulder 32 formed on the shaft 20. In addition, a reaction device 44 can be situated between the stop disk 42 and a shoulder 45 that is formed on the collar 4, as illustrated in FIG. 17. This reaction device 44 can also be situated directly between the collar 4 and the shaft 20 without the presence of a stop disk 42. The reaction device 44 can be any device that would provide a dampening function, such as an elastomeric material and/or a spring. As illustrated in FIG. 18, when force F is applied, the reaction device 44 pushes against the shoulder 45 on the collar 4, keeping the collar 4 in place while the stop disk 42 abuts the shoulder 32 on the shaft 20.

Figure 19:
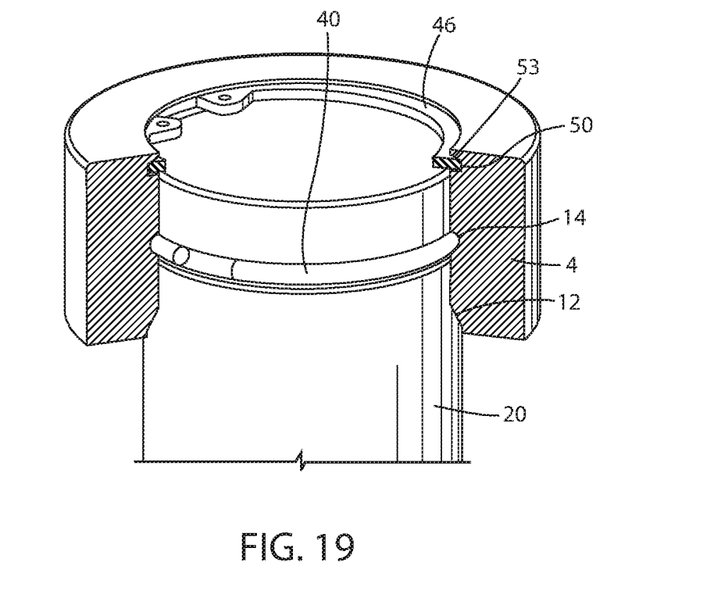
FIG. 19 is another embodiment of the collar and shaft assembly utilizing an additional ring for securing the collar to the shaft.
Figure 20:
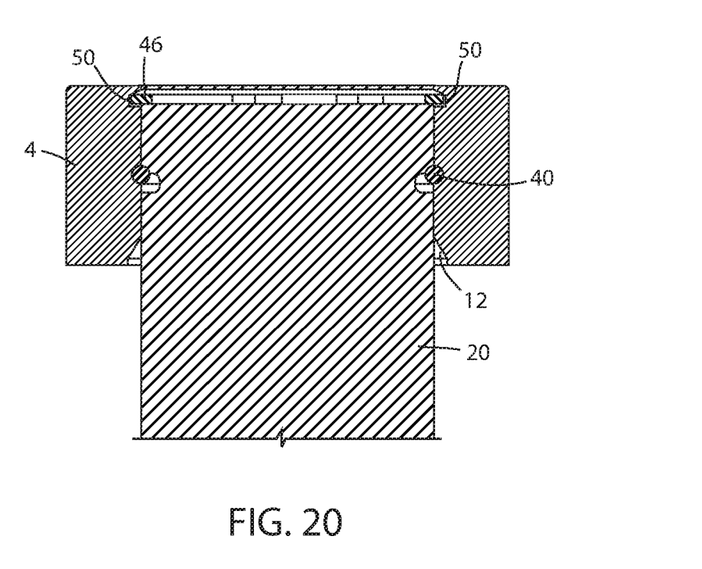
FIG. 20 is a partial cross-sectional view of the collar and shaft assembly shown in FIG. 19.
Figure 21:
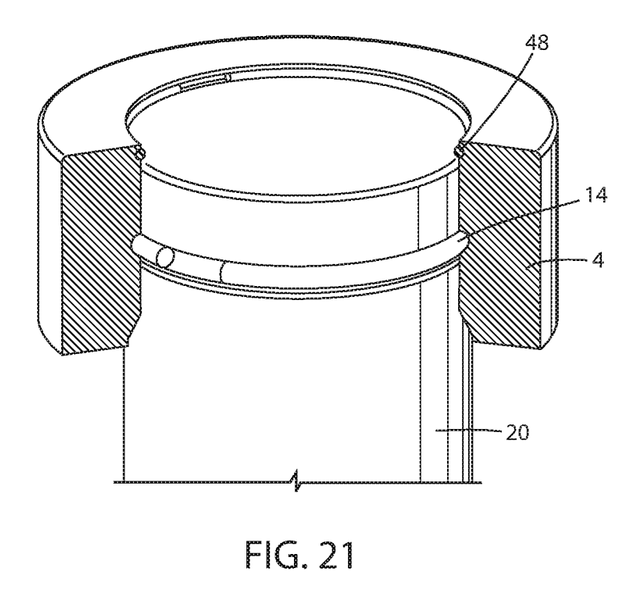
FIG. 21 is another embodiment of a collar and shaft assembly utilizing another device for securing the collar to the shaft.
Figure 22:
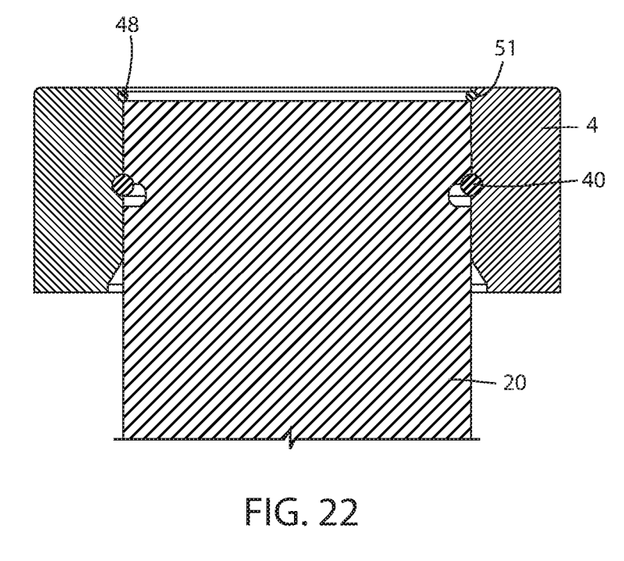
FIG. 22 is a partial cross-sectional view of the collar and shaft assembly shown in FIG. 21.

Additional embodiments include different ways of preventing movement of the collar 4 with respect to the shaft 20. As illustrated in FIG. 19, a retaining ring 46 can be included to retain the collar 4 on the shaft 20. Specifically, the retaining ring 46 is received in a second groove 50 in collar 4 that is located near the first end 16 of the collar 4. This groove 50 can include a tapered portion 53 to permit the compression of the retaining ring 46 to fit into and expand in groove 50. As illustrated in FIGS. 21 and 22, a C-ring 48 can be used into fit into a groove 51 located near the first end 16 of the collar 4 to restriction the movement of the collar 4 on the shaft 20.

Figure 23:
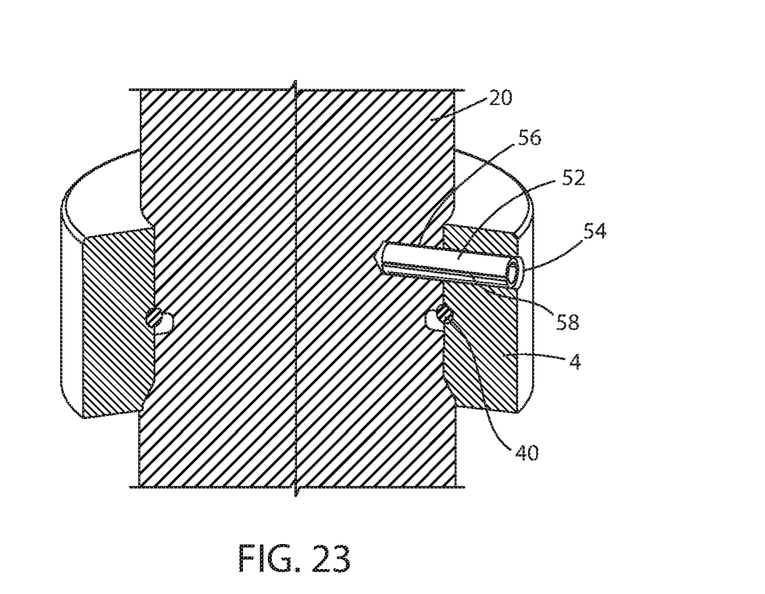
FIG. 23 is a partial cross-sectional view of another embodiment of the collar and shaft assembly utilizing a locating device to help secure the location of the collar on the shaft.
Figure 24:
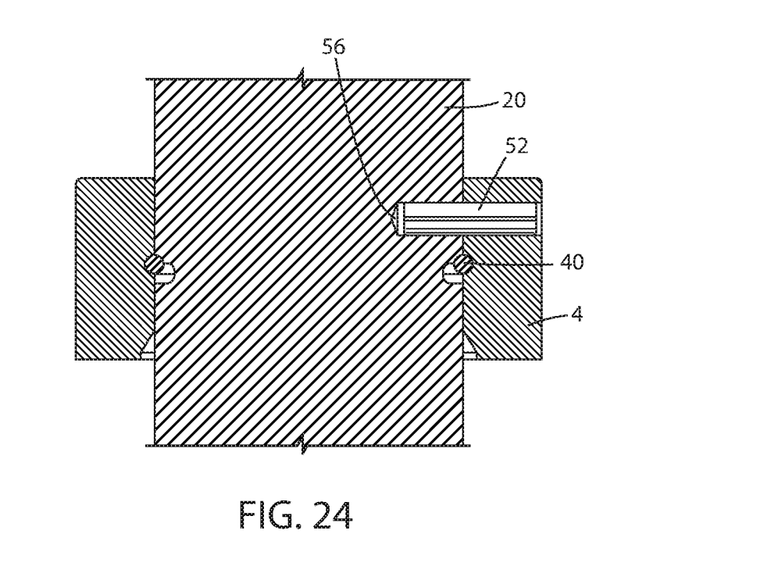
FIG. 24 is a partial cross-sectional view of the collar and shaft assembly shown in FIG. 23.
Figure 25:
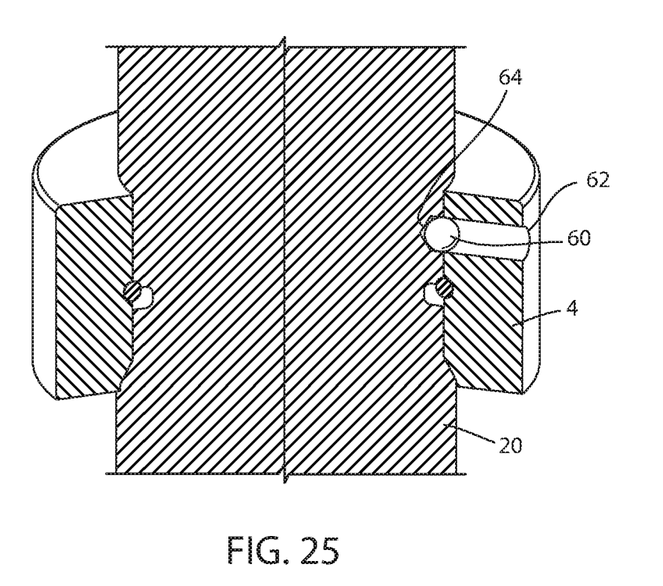
FIG. 25 is a partial cross-sectional view of another embodiment of a collar and shaft assembly utilizing another locating device to help secure the collar on the shaft.

As illustrated in FIGS. 23 and 24, an alignment member 52 can be inserted through an opening 54 in the collar 4 and into an opening 56 in the shaft 20 to prevent movement of the collar 4 on the shaft 20. The alignment member 52 can be a dowel with a seam 58 such that the dowel can expand once it has been inserted into the aligned openings 54, 56, as illustrated in FIG. 24. Openings 54 and 56 should be of a similar diameter and generally align when the retainer 40 is seated in the first portion 28 of the stepped groove 26 on the shaft 20 and the groove 14 of collar 4.

Figure 26:
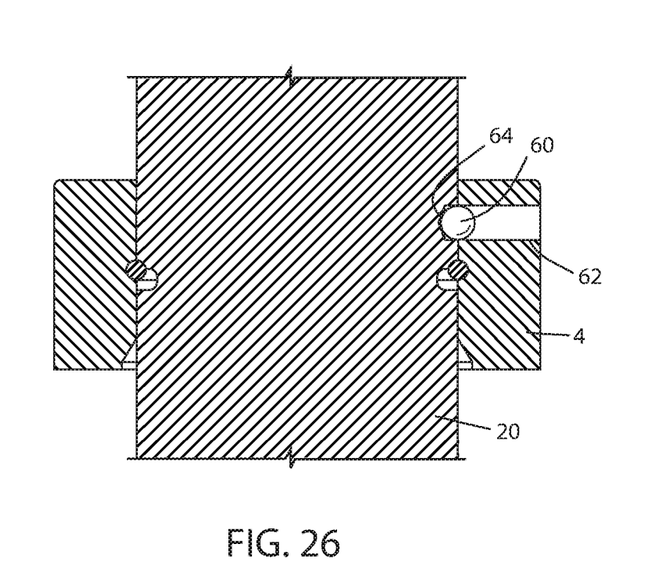
FIG. 26 is a partial cross-sectional view of the collar and shaft assembly shown in FIG. 25.
Figure 27:
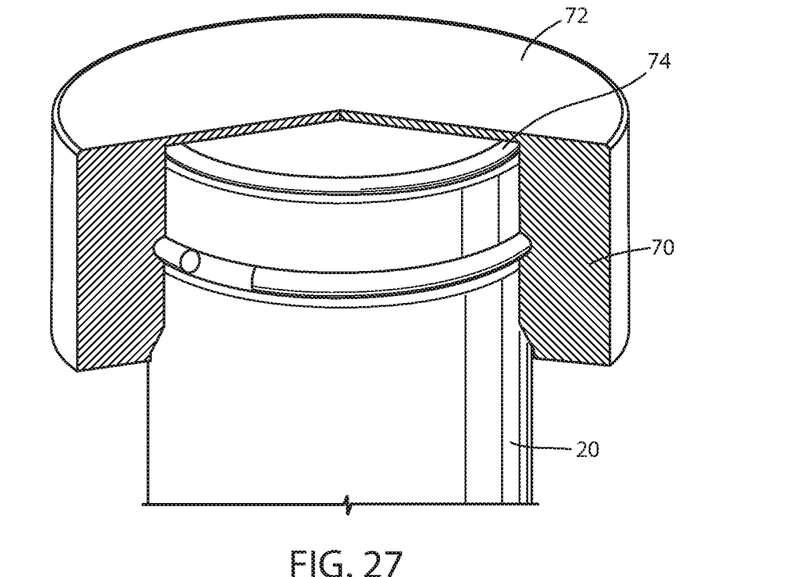
FIG. 27 is a partial cross-sectional view of another embodiment of a collar and shaft assembly utilizing a cap on the collar.

In another embodiment, a steel ball 60 can be placed through an opening 62 in the collar 4 to fit into opening 64 in the shaft 20. The ball 60 should be press-fit into such openings 62, 64 and should situate the ball 60 to prevent movement of the collar 4 with respect to shaft 20. In particular, the opening 64 in the shaft 20 should be smaller in depth than the diameter of the ball 60 so that the ball 60 contacts surfaces in both openings 62, 64, as illustrated in FIG. 26.

Figure 28:
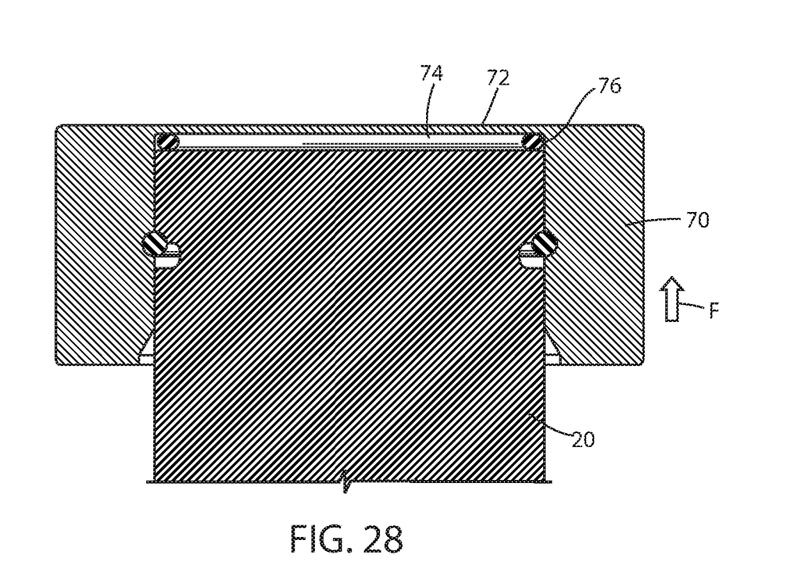
FIG. 28 is a partial cross-sectional view of the collar and shaft assembly shown in FIG. 27.

In another embodiment, the collar 70 has a cap 72 with an opening 76. A reaction device 74 can be located between the first end 22 of the shaft 20 and the cap 72 of the collar 70. The reaction device 74 can be a spring, elastomeric member, or other device. In the embodiment illustrated in FIGS. 27 and 28, the reaction device 74 is an elastomeric 0-ring. As illustrated in FIG. 28, when force F is applied, the reaction device 74 is partially compressed to keep the collar 70 in place. In the embodiment illustrated in FIGS. 27 and 28, the collar 70 is located at one end of the shaft 20. This is an example of how a collar 4, 70 can be located at either end of the shaft 20 with or without a cap 72. In addition, more than one collar 4, 70 can be used on a single shaft 20.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A collar and shaft assembly, comprising:
    a shaft having a generally cylindrical shape with a generally uniform diameter, comprising:
        a first end portion;
        a second end portion; and
        a stepped groove extending circumferentially about the exterior surface of the shaft;
    a collar having a generally cylindrical shape with a generally uniform outer diameter, comprising:
        a first end portion;
        a second end portion;
        an aperture that extends through the collar having a first generally cylindrical inner sidewall, located near the first end portion, and a second generally tapered inner sidewall, located near the second end portion; and
        a groove extending circumferentially about the interior surface of said first generally cylindrical inner sidewall; and
    a retainer ring closely received and retained in the stepped groove in said shaft and in the groove on said collar.

2. A collar and shaft assembly as set forth in claim 1, wherein said retainer ring is a metal C-ring.

3. A collar and shaft assembly as set forth in claim 1, wherein said stepped groove on said shaft is located between said first end portion and said second end portion of said shaft.

4. A collar and shaft assembly as set forth in claim 1, wherein said stepped groove on said shaft includes a first portion with a first groove depth and a second portion with a second groove depth that is greater than said first groove depth.

5. A collar and shaft assembly as set forth in claim 4, wherein said first portion of said stepped groove is located on the portion of the stepped groove that is closest to the first end portion of the shaft and said second portion of said stepped groove is located on the portion of the stepped groove that is closest to the second end portion of the shaft.

6. A method of making a collar and shaft assembly, comprising:
    forming a generally cylindrical shaft with a generally uniform diameter, including:
        a first end portion;
        a second end portion; and
        a stepped groove extending circumferentially about the exterior surface of the shaft, located between said first end portion and said second end portion, said stepped groove including a first portion with a first groove depth and a second portion with a second groove depth that is greater than said first groove depth;
    forming a generally cylindrical collar with a generally uniform outer diameter, including:
        a first end portion;
        a second end portion;
        an aperture that extends through the collar having a first generally cylindrical inner sidewall, located near the first end portion, and a second generally tapered inner sidewall, located near the second end portion;
    providing a retainer ring to be closely received by the stepped groove;
    advancing the collar over said first end portion of said shaft toward said second end of said shaft until said generally tapered portion of the collar engages and compresses the retainer ring into the second portion of the stepped groove; and
    advancing the collar over the shaft until said retainer ring expands and is seated in between said first portion of the stepped groove of the shaft and a groove on said collar.

7. A method as set forth in claim 6, including:
    securing one end of said shaft to one die member of a metal forming die which has first and second die members which mutually converge and diverge to form metal parts.

* * * * *